United States Patent
Li et al.

(10) Patent No.: US 11,488,227 B2
(45) Date of Patent: Nov. 1, 2022

(54) TOPOLOGY BASED INTEROPERABILITY DETERMINATION FOR INFORMATION TECHNOLOGY INFRASTRUCTURE

(71) Applicant: INTERNATIONAL BUSINESS MACHINES CORPORATION, Armonk, NY (US)

(72) Inventors: Qi Cheng Li, Beijing (CN); Lijun Mei, Beijing (CN); Hao Chen, Chaoyang District (CN); Xin Zhou, ChaoYang District (CN); Chuang Gan, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

(21) Appl. No.: 16/936,537

(22) Filed: Jul. 23, 2020

(65) Prior Publication Data
US 2022/0027974 A1  Jan. 27, 2022

(51) Int. Cl.
| G06Q 30/00 | (2012.01) |
| G06Q 30/06 | (2012.01) |
| G06Q 10/00 | (2012.01) |
| G06F 16/9535 | (2019.01) |
| G06F 16/901 | (2019.01) |
| G06Q 10/06 | (2012.01) |

(52) U.S. Cl.
CPC ..... *G06Q 30/0631* (2013.01); *G06F 16/9024* (2019.01); *G06F 16/9535* (2019.01); *G06Q 10/0635* (2013.01); *G06Q 10/20* (2013.01)

(58) Field of Classification Search
None
See application file for complete search history.

(56) References Cited

U.S. PATENT DOCUMENTS

| 6,225,999 B1 * | 5/2001 | Jain ........................ H04L 41/06 715/969 |
| 8,713,183 B2 | 4/2014 | Mohammed et al. |
| 2009/0113088 A1 | 4/2009 | Illowsky et al. |

OTHER PUBLICATIONS

Chilcott, "UC Systems Interoperability: Embracing the Multi-vendor," Product & Solution; URL: https://www.ir.com/blog/communications/uc-systems-interoperability-embracing-the-multi-vendor; Retrieved: Jun. 18, 2020; 9 pages.

(Continued)

*Primary Examiner* — Mila Airapetian
(74) *Attorney, Agent, or Firm* — Cantor Colburn LLP; Joseph Petrokaitis (57) ABSTRACT

Techniques for topology based interoperability determination for an information technology (IT) infrastructure are described herein. An aspect includes receiving a replacement notification for an element of an IT infrastructure. A topology subgraph corresponding to the element is generated based on a topology graph of the IT infrastructure. A plurality of replacement candidates for the element is determined. A respective interoperability subgraph based on the topology subgraph is generated for each replacement candidate of the plurality of replacement candidates. A recommended replacement candidate is selected from the plurality of replacement candidates based on the generated interoperability subgraphs.

20 Claims, 7 Drawing Sheets

(56) References Cited

OTHER PUBLICATIONS ip.com, "Storage Compatibility Matrix Enforcer," An IP.com Prior Art Database Technical Disclosure, Feb. 24, 2010, 6 pages.
VMWARE, "VMware Compatibility Guide," VMware; URL: https://www.vmware.com/resources/compatibility/search.php?deviceCategory=san; Retrieved: Jun. 18, 2020; 1 page.

* cited by examiner

TOPOLOGY BASED INTEROPERABILITY DETERMINATION FOR INFORMATION TECHNOLOGY INFRASTRUCTURE

BACKGROUND

The present invention generally relates to computer systems, and more specifically, to topology based interoperability determination for an information technology (IT) infrastructure.

An IT infrastructure can include a relatively large number of interconnected components, such as servers, storage, and switches. A storage controller in an IT infrastructure can manage Input/Output (I/O) requests from networked hosts to one or more storage units, such as storage libraries. Storage controllers include one or more host bus adapters or interfaces to communicate with one or more hosts and adapters or interfaces to communicate with storage servers to which the storage units are attached. IT infrastructures, including storage systems, may need protection from site disasters or outages, where outages may be planned or unplanned. Furthermore, IT infrastructures may require features for data migration, data backup, or data duplication. Implementations for disaster or outage recovery, data migration, data backup, and data duplication may include mirroring or copying of data in storage systems. Such mirroring or copying of data may involve relatively complex interactions among hosts, storage systems, and connecting networking components of the IT infrastructure.

SUMMARY

Embodiments of the present invention are directed to topology based interoperability determination for an information technology (IT) infrastructure. A non-limiting example computer-implemented method includes receiving a replacement notification for an element of an IT infrastructure. A topology subgraph corresponding to the element is generated based on a topology graph of the IT infrastructure. A plurality of replacement candidates for the element is determined. A respective interoperability subgraph based on the topology subgraph is generated for each replacement candidate of the plurality of replacement candidates. A recommended replacement candidate is selected from the plurality of replacement candidates based on the generated interoperability subgraphs.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide topology based interoperability determination for an information technology (IT) infrastructure. The interconnected components, or elements, of an IT infrastructure (e.g., a data center such as a multiple virtual storage system, or MVS) must be interoperable, or compatible, in order for the IT infrastructure to function. Elements of an IT infrastructure can include, but are not limited to, physical elements such as servers, switches, network adapters, and storage, and software elements such as operating systems (OSs), firmware, and hypervisors. Over time, elements of the IT infrastructure may require replacement, e.g., due to security or performance issues. When an element of the IT infrastructure requires replacement, a number of replacement candidates for the element can be automatically determined, and a recommended replacement candidate can be selected based on the topology of the IT infrastructure. The recommended replacement candidate can be selected based on an interoperability graph that is generated from vendor data corresponding to available IT infrastructure components. The vendor data can be harvested from element metadata across a number of vendor websites in some embodiments of the invention.

Each element in an IT infrastructure may need to be interoperable with multiple other elements of the IT infrastructure in order for the IT infrastructure to function; compatibility checks can be performed for every element that is directly connected to an element that is being replaced. For each element of the IT infrastructure, there may be multiple vendors that offer various versions of the element, and each vendor may provide different metadata regarding the IT element. Harvested metadata from various vendors can be compiled in the interoperability graph that includes whether various IT elements are compatible, based on the vendor data. In some embodiments of the invention, the interoperability graph can include an interoperability matrix. Approximate matching can be used to determine matching elements from the vendor data, and pairs of directly linked matches can be checked for compatibility against the interoperability matrix.

Embodiments of the invention can include a build-time phase, in which a topology graph of an IT infrastructure is determined, and the interoperability graph, including the interoperability matrix, is generated based on metadata that is gathered from various vendor data sources. During operation of the IT infrastructure, when it is determined that an element of the IT infrastructure needs to be replaced, a topology subgraph for the IT element can be determined for the element that is being replaced based on the topology graph of the IT infrastructure. The topology subgraph can include any elements that the IT element must be directly compatible with in order to function in the IT infrastructure, e.g., a set of nodes $N_t$ that are directly linked to the IT element in the topology graph. A number of replacement candidates can be determined for the IT element based on the vendor data in the interoperability graph, and approximate matching can be performed based on the interoperability graph to determine a number of elements $N_i$ that are compatible with each of the replacement candidates. A replacement candidate having a highest number of compatible elements $N_i$ may be selected as a recommended replacement candidate.

Figure 1:
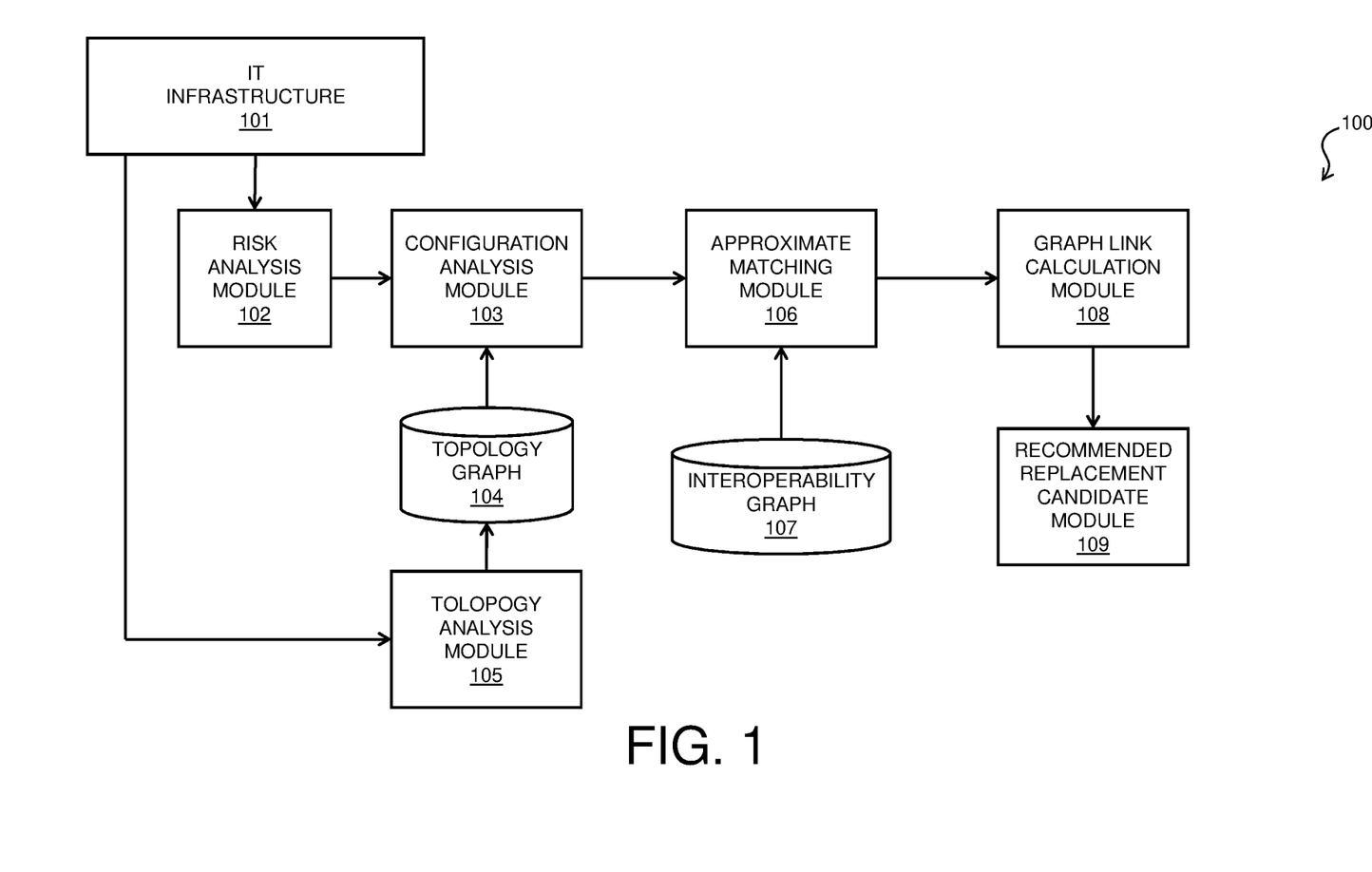
FIG. 1 is a block diagram of components of a system for topology based interoperability determination for an information technology (IT) infrastructure in accordance with one or more embodiments of the present invention.

Turning now to FIG. 1, system 100 that includes interoperability determination for an IT infrastructure is generally shown in accordance with one or more embodiments of the present invention. In accordance with embodiments of the invention, the system 100 can be implemented in conjunction with any appropriate computer system, including but not limited to computer system 600 of FIG. 6. System 100 includes an IT infrastructure 101, which can include any appropriate elements that are interconnected in any appropriate manner. Elements of the IT infrastructure 101 can include, but are not limited to, servers, storage, switches, adapters, OSs, firmware, pluggable devices, and hypervisors. Some embodiments of IT infrastructure 101 can correspond to IT infrastructure 300 of FIG. 3, which is discussed below. Risk analysis module 102 is in communication with IT infrastructure 101. Risk analysis module 102 can identify elements within IT infrastructure 101 that are in need of replacement or upgrade. An element of IT infrastructure 101 can be identified as requiring replacement or upgrade based on any appropriate criteria, including but not limited to the age of the IT element, performance issues, and/or security issues. Based on a determination by risk analysis module 102 that an element of IT infrastructure 101 requires replacement, a notification can be sent from risk analysis module 102 to configuration analysis module 103. In some embodiments of system 100, an administrator of the IT infrastructure 101 can identify an IT element that requires replacement and provide the notification directly to configuration analysis module 103.

Configuration analysis module 103 is in communication with topology graph 104, which stores a topology graph of the IT infrastructure 101 that was determined by topology analysis module 105. The topology graph 104 can include a set of interconnected nodes, each node corresponding to an element of the IT infrastructure 101, and respective node data corresponding to each of the interconnected nodes. Embodiments of a topology graph and node data which can correspond to embodiments of topology graph 104 are discussed below with respect to FIG. 5A. In embodiments of topology graph 104, the node data that is stored regarding each node can include any of, but is not limited to, an entity identifier (ID), which gives a name of the element, a vendor name of the element, a product ID, a processor type, a firmware name and version, a description, and a software version. Configuration analysis module 103 determines a subset $N_t$ of the nodes in the topology graph 104 that are directly linked to the element that is being replaced. A topology subgraph of topology graph 104, including the element that is being replaced and the set of directly linked nodes $N_t$, is provided from configuration analysis module 103 to approximate matching module 106.

Approximate matching module 106 determines, based on the node data for each of the nodes $N_t$ in the topology subgraph received from configuration analysis module 103, a set of approximately matching entries in interoperability graph 107. Interoperability graph 107 is determined by compiling vendor data corresponding to available IT infrastructure elements. In some embodiments of the invention, interoperability graph 107 can be determined by harvesting data across a plurality of vendor websites. Interoperability graph 107 can include an interoperability matrix in some embodiments of the invention. The interoperability matrix can include, for each possible pair of IT elements included in the interoperability graph, an entry that indicates whether the pair of IT elements are compatible. The interoperability matrix can be compiled based on the harvested vendor data. Embodiments of data that can be included in interoperability graph 107 are discussed below in further detail with respect to FIG. 4. Approximate matching module 106 can determine, for each node of nodes $N_t$ in the topology subgraph received from configuration analysis module 103, any data entries in interoperability graph 107 that are matches to the node data of the node.

Embodiments of approximate matching module 106 can determine matches in interoperability graph 107 in any appropriate manner. In some embodiments of the invention, approximate matching module 106 can implement approximate string matching (e.g., fuzzy matching) in which an edit distance (e.g., a number of primitive operations to convert the strings into an exact match), or Levenshtein distance, between a first string (e.g., a product ID) corresponding to a node and a second string (e.g., a product ID) corresponding to a data entry is determined, and a match between the node and the data entry is identified based on the determined distance being less than a predetermined match threshold. Each match that is determined for the element that is being replaced can be designated as a replacement candidate, and approximate matching module 106 determines a respective interoperability subgraph for each replacement candidate. An interoperability subgraph for a replacement candidate can include any data entries that are identified by the approximate matching module 106 as approximate matches to a node $N_t$ that are compatible with the replacement candidate based on the interoperability matrix. Embodiments of interoperability subgraphs that can be determined by embodiments of approximate matching module 106 are illustrated below with respect to FIG. 5B. The interoperability subgraphs determined by approximate matching module 106 are provided to graph link calculation module 108.

Graph link calculation module 108 can determine, for each interoperability subgraph received from approximate matching module 106, a number of directly linked nodes $N_i$ in the replacement candidate's corresponding to the interoperability subgraph. The respective number of directly linked nodes determined by graph link calculation module 108 is provided to recommended replacement candidate module 109. Recommended replacement candidate module 109 selects a replacement candidate having a highest number of directly linked nodes $N_i$. The selected replacement candidate can be provided to an administrator of the IT infrastructure 101 in some embodiments of the invention; the administrator can initiate replacement of the element that was identified by risk analysis module 102 based on the recommended replacement candidate.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, etc.).

Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
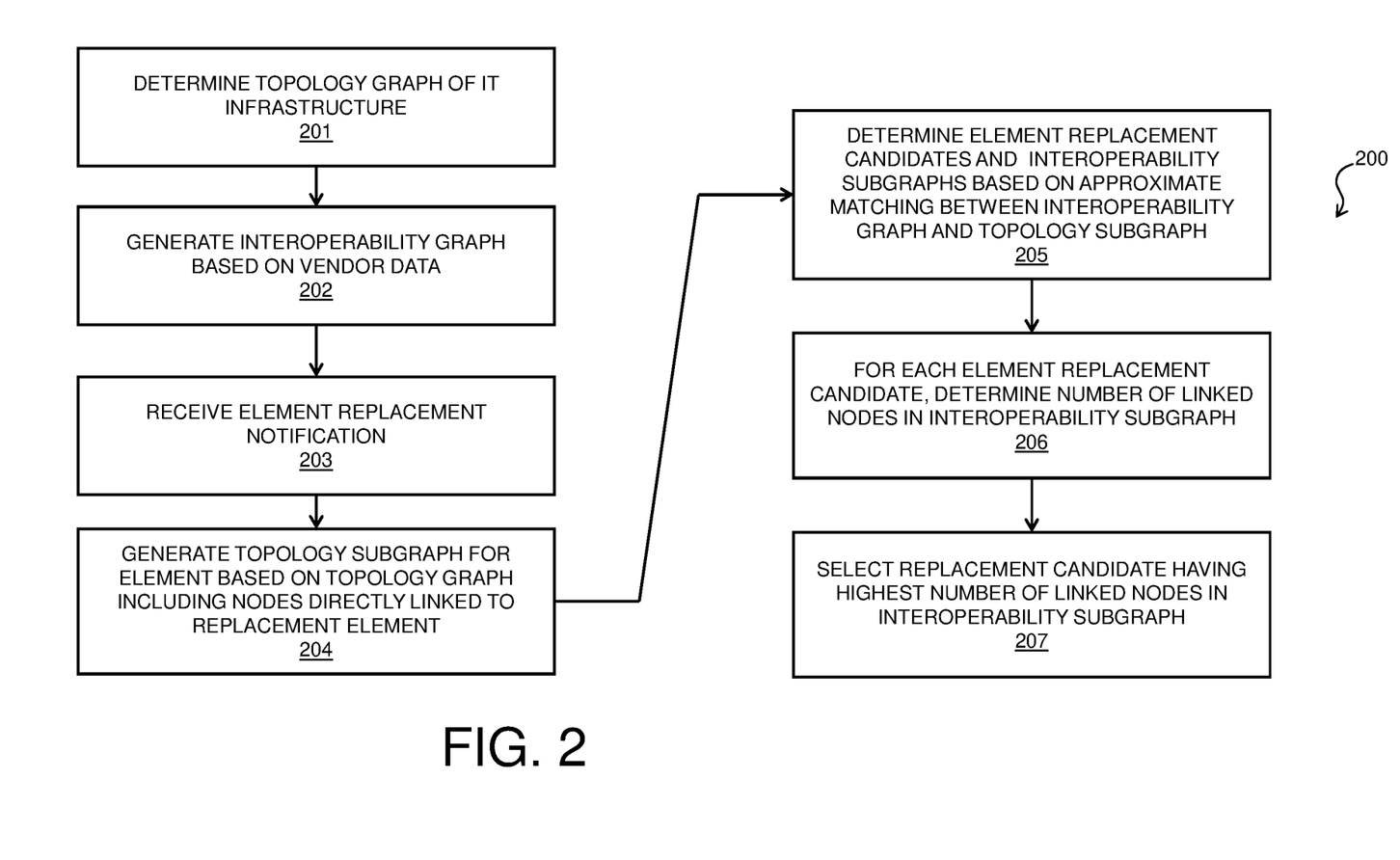
FIG. 2 is a flow diagram of a process for topology based interoperability determination for an IT infrastructure in accordance with one or more embodiments of the present invention.

FIG. 2 shows a process flow diagram of a method 200 for interoperability determination for an IT infrastructure in accordance with one or more embodiments of the present invention. Embodiments of method 200 can be implemented in conjunction with any appropriate computer system, such as computer system 600 of FIG. 6. Embodiments of method 200 can be implemented in, and are discussed with reference to, system 100 of FIG. 1. In block 201 of method 200, a topology graph 104 of an IT infrastructure 101 is determined. The topology graph 104 can be determined in block 201 by topology analysis module 105 of system 100. The topology graph 104 includes a plurality of interconnected nodes, each node corresponding to an element of the IT infrastructure 101, and includes node data corresponding to each node of the interconnected nodes. Embodiments of a topology graph and corresponding node data that can be determined in bock 201 are discussed below with respect to FIG. 5A.

In block 202, an interoperability graph 107 of IT elements, including an interoperability matrix, is generated. The interoperability graph 107 can be compiled based on vendor data in any appropriate, for example, by harvesting data from a vendor website. Embodiments of data that can be harvested for an included in an interoperability graph 107 are discussed in further detail below with respect to FIG. 4. In block 203, a replacement notification for an element of the IT infrastructure 101 is received by configuration analysis module 103. In some embodiments of block 203, the replacement notification can be received from risk analysis module 102; in some embodiments of block 203, the replacement notification can be received directly from an administrator of the IT infrastructure.

In block 204, a topology subgraph is generated for the element corresponding to the replacement notification that was received in block 203 by configuration analysis module 103. The topology subgraph can include the replacement element and any directly connected nodes ($N_t$) to the replacement element in topology graph 104 that was determined in block 201, in addition to node data for each node that is included in the topology subgraph. In block 205, one or more element replacement candidates are determined for the replacement element based on interoperability graph 107 that was determined in block 202, and a respective interoperability subgraph is determined for each replacement candidate based on interoperability graph 107. The interoperability subgraphs are determined by approximate matching module 106. Embodiments of interoperability subgraphs that can be generated in block 205 are discussed in further detail below with respect to FIG. 5B. In some embodiments of the invention, approximate matching module 106 can implement approximate string matching (e.g., fuzzy matching) in which an edit distance (e.g., a number of primitive operations to convert the strings into an exact match), or Levenshtein distance, between a first string (e.g., a product ID) corresponding to a node and a second string (e.g., a product ID) corresponding to a data entry is determined, and a match can be identified between the node and the data entry in block 205 based on the determined distance being less than a predetermined match threshold.

In block 206, for each replacement candidate that was determined in block 205, a number of directly linked nodes $N_i$ to the replacement candidate in the interoperability subgraph corresponding to the replacement candidate is determined by graph link calculation module 108. In block 207, recommended replacement candidate module 109 determines a recommended replacement candidate having a highest number of directly linked nodes $N_i$ in the replacement candidate's respective interoperability subgraph, and provides the determined recommended replacement candidate to an administrator of IT infrastructure 101. The element can be replaced in the IT infrastructure based on the recommended replacement candidate.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
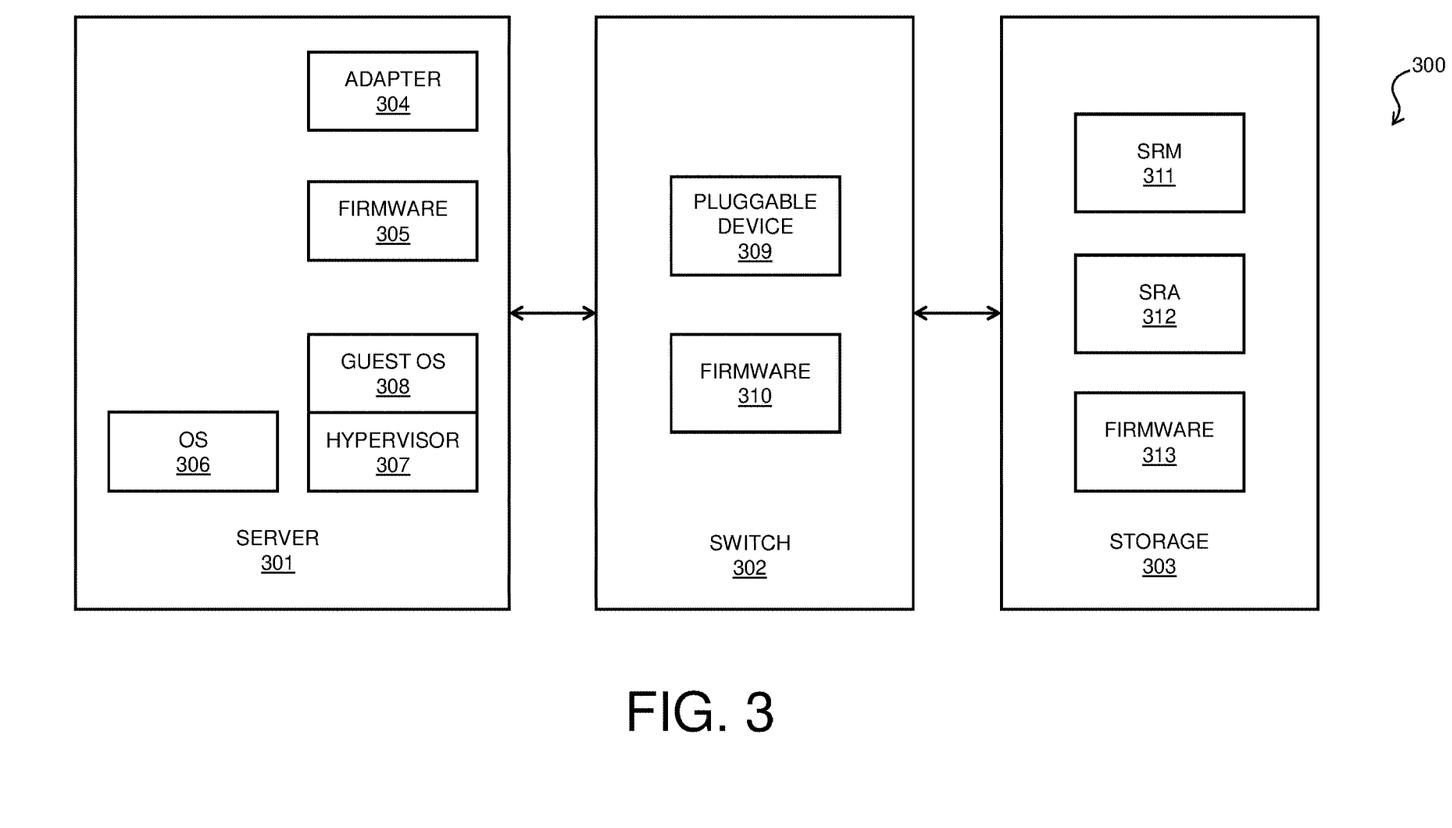
FIG. 3 illustrates an IT infrastructure for topology based interoperability determination for an IT infrastructure in accordance with one or more embodiments of the present invention.

FIG. 3 illustrates an IT infrastructure 300 for topology based interoperability determination for an IT infrastructure in accordance with one or more embodiments of the present invention. Embodiments of IT infrastructure 300 can be implemented in conjunction with any appropriate computer system, including but not limited to computer system 600 of FIG. 6. Embodiments of IT infrastructure 300 can correspond to IT infrastructure 101 of FIG. 1. Embodiments of IT infrastructure 300 can be included in an MVS system. IT infrastructure 300 includes a plurality of elements, including a server 301 that is in communication with storage 303 via a switch 302. The server 301 includes an adapter 304, which enables network communication with switch 302; firmware 305, an OS 306, and a hypervisor 307 that hosts a guest OS 308. Switch 302 includes a pluggable device 309 and firmware 310. Storage 303 includes storage resource management (SRM) 311, storage replication adapter (SRA) 312, and firmware 313.

Connected elements in embodiments of an IT infrastructure 300 must be interoperable, or compatible, in order for IT infrastructure 300 to function; these connections are captured in the topology graph 104. For example, in some embodiments of the invention, server 301 must be interoperable with OS 306; server 301 must be interoperable with hypervisor 307; hypervisor 307 must be interoperable with guest OS 308; and the server 301, OS 306, and hypervisor 307 must be interoperable with the adapter 304 and firmware 305. Further, in some embodiments of the invention, hypervisor 307 must be interoperable with storage 303 and firmware 313; server 301 and firmware 305 must be interoperable with storage 303 and firmware 313; SRM 311 must be interoperable with SRA 312; server 301 and firmware 305 must be interoperable with switch 302 and firmware 310; and switch 302 must be interoperable with pluggable device 309.

In order to determine a recommended replacement candidate for any of elements 301-313, a respective set of compatibility checks may be performed based on the interoperability matrix with respect to any approximate matches that are candidates for inclusion in an interoperability subgraph for each replacement candidate. For example, for a replacement candidate for server 301, the compatibility between server 301 and OS 306 and/or hypervisor 307 can be checked; the compatibility between hypervisor 307 and guest OS 308 can be checked, and the compatibility between the server 301/hypervisor 307/OS 306 and the adapter 304/firmware 305 can be checked. For example, for a replacement candidate for storage 303, the compatibility between the hypervisor 307 and the storage 303/firmware 313 can be checked; the compatibility between the server 301/firmware 305 and the storage 303/firmware 313 can be checked; and the compatibility between the SRM 311 and the SRA 312 can be checked. For example, for a replacement candidate for switch 302, the compatibility between the server 301/firmware 305 and switch 302/firmware 310 can be checked; and the compatibility between the switch 302 and the pluggable device 309 can be checked.

It is to be understood that the block diagram of FIG. 3 is not intended to indicate that the IT infrastructure 300 is to include all of the components shown in FIG. 3. Rather, the IT infrastructure 300 can include any appropriate fewer or additional components not illustrated in FIG. 3 (e.g., additional elements such as servers, switches, storage modules, OSs, hypervisors, firmware, pluggable devices, SRMs, and SRAs, memory components, embedded controllers, functional blocks, connections between elements, modules, inputs, outputs, etc.). Further, the embodiments described herein with respect to IT infrastructure 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
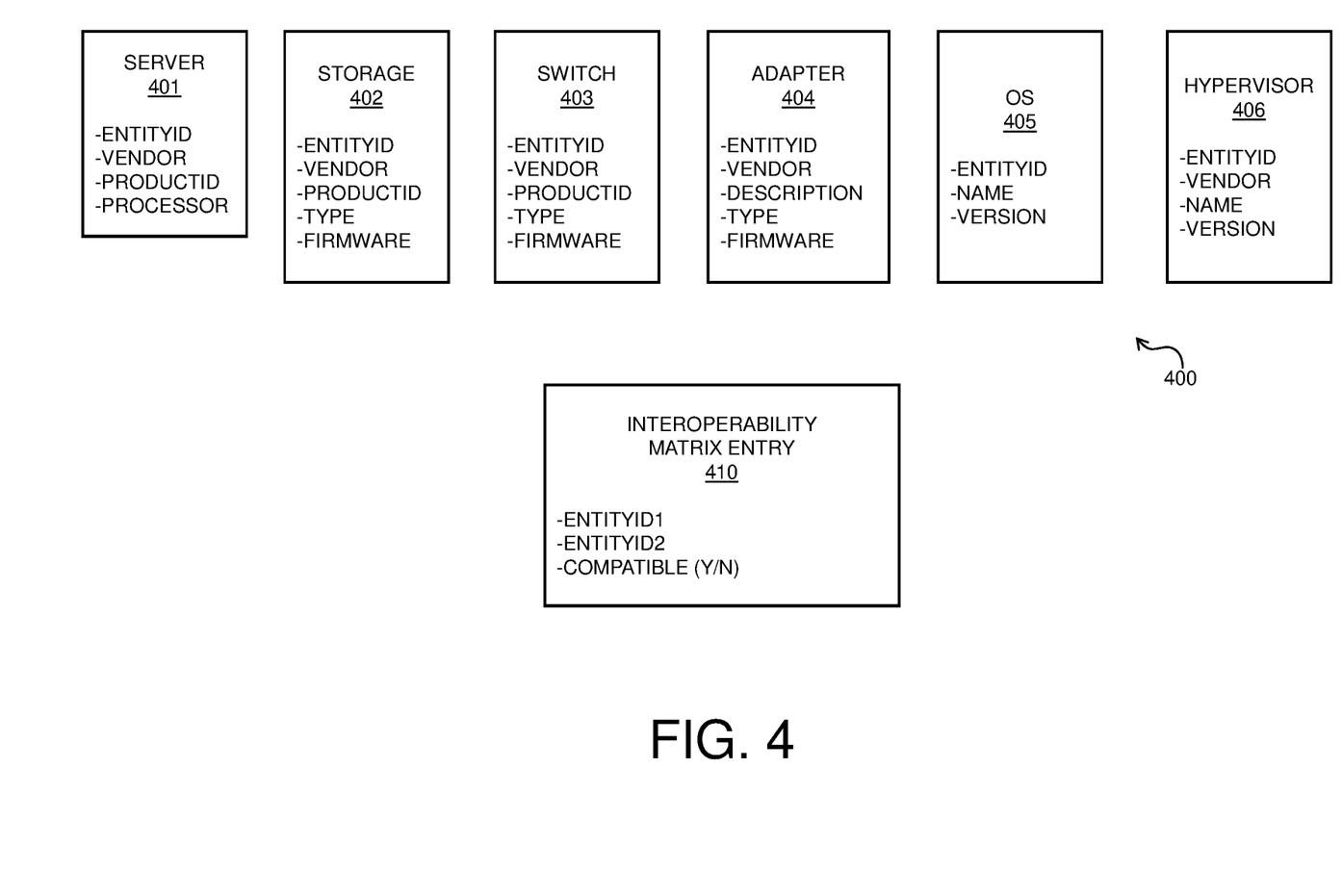
FIG. 4 illustrates interoperability metadata for topology based interoperability determination for an IT infrastructure in accordance with one or more embodiments of the present invention.

FIG. 4 illustrates interoperability metadata 400 for topology based interoperability determination for an IT infrastructure in accordance with one or more embodiments of the present invention. Interoperability metadata 400 includes a plurality of data entries 401-406, each data entry corresponding to vendor metadata for an available IT infrastructure element. The data in data entries 401-406 can be harvested from any appropriate sources, such as a plurality of vendor websites, in some embodiments of the invention. Entry 401 corresponds to a server, and includes an entity ID, a vendor name, a product ID, and a processor ID. Entry 402 corresponds to storage, and includes an entity ID, a vendor name, a product ID, a type, and a firmware version. Entry 403 corresponds to a switch, and includes an entity ID, a vendor name, a product ID, a type, and a firmware version. Entry 404 corresponds to an adapter, and includes an entity ID, a vendor name, a description, a type, and a firmware version. Entry 405 corresponds to an OS, and includes an entity ID, a name, and a version. Entry 406 corresponds to a hypervisor, and includes an entity ID, a vendor name, and a version.

A single IT element that is offered by a number of different vendors may have a different data entry for each vendor in interoperability metadata 400. For example, a single server may have different product identifiers (IDs) for different vendors. A server product ID may be given as, for example, "UCSB-B200-M3" by International Business Machines® (IBM), "Cisco UCS B200 M3" from Cisco®, and "UCS—B200 M3 Blade Server" from VMware®. A same OS may also have various formats, e.g., "Windows Server 2008 R2, SP1" from the OS metadata and "Windows 6.1" from Tivoli system Automation® (TSA) inventory; "Red Hat Linux 6.2" from the OS metadata, "Red Hat Linux Enterprise Edition 6.2E" from TSA inventory, and "CentOS 4/5 or later (32-bit)". A product ID for the same network adapter may be given as, for example, "Intel® Ethernet Server Adapter I350-T4 #4" from IBM, "Intel® Ethernet Server Adapter I350-T4" from Cisco; and "Broadcom BCM5709C NetXtreme II GigE (NDIS VBD Client)" from IBM and "NetXtreme II 5709 Dual Port Gigabit Ethernet Onboard Controller" from Cisco. The harvested metadata from various vendors can be compiled in the interoperability graph 107. Each product ID, format, or version of an IT element may have a respective data entry in interoperability metadata 400.

An example data entry corresponding to a server, such as entry 401, is illustrated in Table 1:

TABLE 1

| Data entry for server |
| --- |
| Entity ID: 8ff98f6ce23b47f1b7dd1dbe12777de2<br>Vendor: Cisco<br>Product ID: Cisco UCS C24 M3L<br>Processor: Intel Xeon E5-2400 Series processors |

An example data entry corresponding to an OS, such as entry 405, is illustrated in Table 2:

TABLE 2

| Data entry for OS |
| --- |
| Entity ID: 7ec88314895b47e9bd51380304edd024<br>Name: Red Hat<br>Version: Enterprise Linux 6.9 |

Data from data entries such as data entries 401-406 may be processed to determine an interoperability matrix in interoperability graph 107 in some embodiments of the invention. An example interoperability matrix entry 410 includes a first entity ID, a second entity ID, and whether not the elements corresponding to the first entity ID and the second entity ID are compatible, which may be either "yes" or "no" in some embodiments of the invention. Any linked pairs of approximate matches in an interoperability subgraph may be checked for compatibility using the interoperability matrix. An example interoperability matrix entry, such as interoperability matrix entry 410, corresponding to Tables 1 and 2, is illustrated in Table 3:

TABLE 3

| Interoperability matrix entry: |
| --- |
| Entity ID1: 8ff98f6ce23b47f1b7dd1dbe12777de2<br>Entity ID2: 7ec88314895b47e9bd51380304edd024<br>Compatible: Yes |

The interoperability data can be determined from a vendor website in some embodiments. Table 4 illustrates an example of hypertext markup language (HTML) including compatibility data that can be harvested from a vendor website and used to determine a data entry and interoperability matrix entry for a server having a product ID of "Cisco UCS 8200 MS 2 Socket Blade Server"; Table 4 lists a compatible adapter for the particular server. The HTML in Table 4 can be processed to extract IDs of the compatible adapters and determine an interoperability matrix entry, such as interoperability matrix entry 410, for the server with respect to the listed adapter "Cisco 12G SAS Modular HBA".

TABLE 4

Vendor website compatibility data

```
<div class="col-sm-5 col-xs-5 component">
    <div>...</div>
    <ul class="search-tree-new" style="display: block;">
        <li name="hw_adapters">
        <div>...</div>
            <ul class="search-tree-filters" style="display: block;">
                <li name="hw_adapters_hba">
                    <div>...</div>
                    <ul style="display: block;">
                        <li> Cisco 12G SAS Modular HBA(Cisco)
                        </li>
                    </ul>
                </li>
                <li name="hw_adapters_nic"> ... </li>
            </ul>
        </li>
        <li name="hw_hdd">...</li>>
        <li name="hw_ssd">...</li>
        <li name="hw_software">...</li>
    </ul>
</div>
```

Interoperability metadata 400 and interoperability matrix entry 410 of FIG. 4 are shown for illustrative purposes only. Interoperability metadata 400 can include any appropriate data regarding any appropriate IT elements in various embodiments of the present invention. Further, an interoperability graph can include any appropriate number of data entries and interoperability matrix entries, each holding any appropriate vendor data.

Figure 5A:
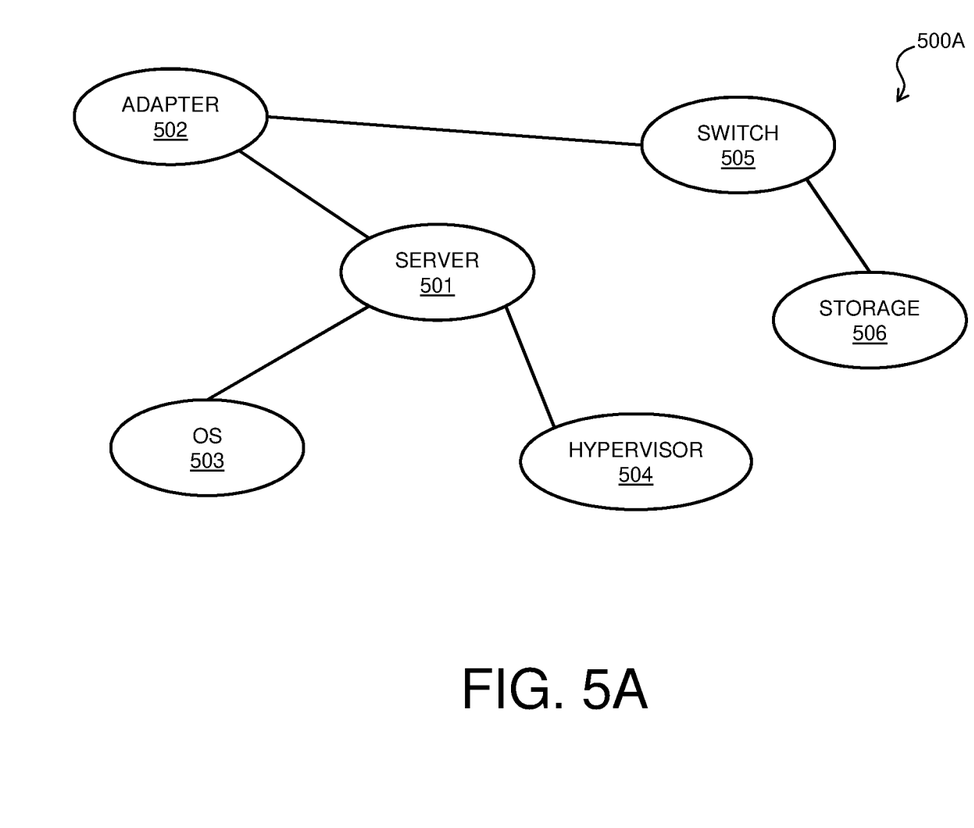
FIG. 5A illustrates a topology graph for topology based interoperability determination for an IT infrastructure in accordance with one or more embodiments of the present invention.

FIG. 5A shows a topology graph 500A for topology based interoperability determination for an IT infrastructure in accordance with one or more embodiments of the present invention. Topology graph 500A can correspond to embodiments of topology graph 104 of FIG. 1. Topology graph 500A includes a plurality of interconnected nodes 501-506, including a server 501, an adapter 502, an OS 503, a hypervisor 504, a switch 505, and storage 506. Each node of nodes 501-506 can include respective node data. An example of node data that can be included in topology graph 500A for server 501 is illustrated with respect to Table 5:

TABLE 5

Example server node data from topology graph

```
{"Manufacture": "Dell",
"ProductID":"Dell Precision Rack 7910",
"guestOSSeries":"Ubuntu",
"guestOSVersion":"17.10",
"hypervisorType": "VMWARE ESX",
"hypervisorVersion": "4.1",
"hbas": [
{
"vendor": "DELL",
"Description": "Dell PERC 5/E",
"firmware":"8c1.0.5"
}}
```

An example of node data that can be included in topology graph 500A for storage 506 is illustrated with respect to Table 6:

TABLE 6

Example storage node data from topology graph

```
{"Manufacture": "Dell",
"ProductID":"Dell PowerVault NX3600",
"SRA":{
"manufacturer": "Huawei Technologies Co. Ltd.",
"name":"Huawei eSDK_Storage_SRA",
"version":"1.3.50.100"
},
"SRM":{
"manufacturer":"VMWARE",
"name":"SRM",
"version":"6.0"
}}
```

An example of node data that can be included in topology graph 500A for switch 505 is illustrated with respect to Table 7:

TABLE 7

Example switch node data from topology graph

```
{"Manufacture": "Juniper",
"ProductID":"ACX500",
" Pluggable ": [
{
"vendor": " Juniper ",
"Description": " EX-SFP-1FE-FX"
}}
```

A topology subgraph can be determined for an IT element that is being replaced based on identification of directly linked nodes to the IT element in a topology graph such as topology graph 500A. The node data of a node of nodes 501-506 that is directly linked to the IT element that is being replaced (i.e., the node is included in the topology subgraph of the IT element that is being replaced) can be used by approximate matching module 106 to determine any data entries that are matches for the node in interoperability graph 107. Any approximate matches that are determined for a node by approximate matching module 106 can be checked against a replacement candidate in the interoperability matrix in order to determine whether a match should be included in an interoperability subgraph for the replacement candidate.

Topology graph 500A of FIG. 5A is shown for illustrative purposes only. A topology graph such as topology graph 500A can include any appropriate number and type of nodes interconnected in any appropriate manner. Further, node data such as is illustrated in Tables 1-3 corresponding to embodiments of a topology graph such as topology graph 500A can include any appropriate information in any appropriate format.

Figure 5B:
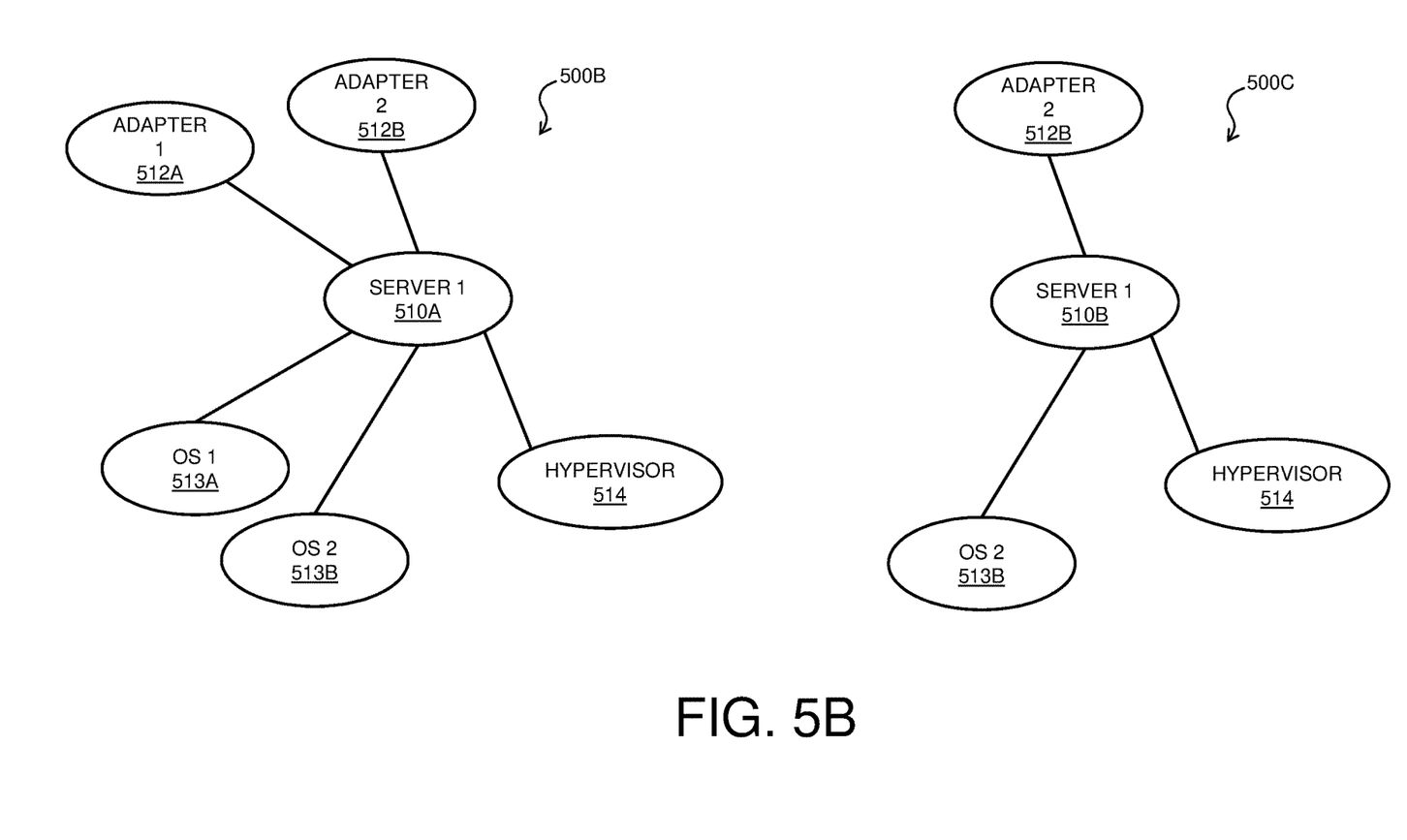
FIG. 5B illustrates interoperability subgraphs for topology based interoperability determination for an IT infrastructure in accordance with one or more embodiments of the present invention.

FIG. 5B shows interoperability subgraphs 500B-C for topology based interoperability determination for an IT infrastructure in accordance with one or more embodiments of the present invention. Interoperability subgraphs 500B-C can be generated by approximate matching module 106 for analysis by graph link calculation module 108 based on a topology subgraph for determining a recommended replacement candidate for server 501. Approximate matching module 106 can determine, based on the node data of server 501, a set of replacements candidates based on data entries such as data entries 401-406 from interoperability metadata 400 in interoperability graph 107. Further, for each element from topology graph 500A that is directly connected to server 501, a set of data entries corresponding to the element is determined based on the interoperability metadata 400 by approximate matching module 106.

Interoperability subgraph 500B corresponds to a first replacement candidate server 510A, and interoperability subgraph 500C corresponds to a second replacement candidate server 510B. In an example embodiment of the invention corresponding to FIGS. 5A-B, adapter 502 of FIG. 5A can have a product ID of "Broadcom 5709 NetXtreme", and OS 503 of FIG. 5A can have a product ID of "CentOS 5.0". It can be determined by approximate matching module 106, based on interoperability graph 107, that a first data entry having a product ID of "BCM5709C NetXtreme" and a second data entry having a product ID of "NetXtreme II 5709" are both matches for adapter 502. It can be determined by approximate matching module 106, based on interoperability graph 107, that a third data entry having a product ID of "CentOS 5.x" and a fourth data entry having a product ID of "CentOS 4/5 or later (32-bit)" are both matches for OS 503. It is determined, based on the interoperability matrix, that the adapters corresponding to the first data entry and the second data entry, and the OSs corresponding to the third data entry and the fourth data entry, are all compatible with first replacement candidate server 510A. Therefore, in interoperability subgraph 500B, the first replacement candidate server 510A is indicated to be compatible with a first adapter 512A, a second adapter 512B, a first OS 513A, a second OS 513B, and a hypervisor 514. It is determined, based on the interoperability matrix, that the adapter corresponding to the second data entry, and the OS corresponding to the fourth data entry, are compatible with second replacement candidate server 510B; the adapter corresponding to the first data entry and the OS corresponding to the third data entry are determined to be incompatible with second replacement candidate server 510B based on the interoperability matrix. In interoperability subgraph 500C, the second replacement candidate server 510B is indicated to be compatible with the second adapter 512B, the second OS 513B, and hypervisor 514. Graph link calculation module 108 can determine that the number of directly link linked nodes $N_i$ in the interoperability subgraph 500B of the first replacement candidate server 510A is higher than the number of directly linked nodes $N_i$ for the second replacement candidate server 510B in its interoperability subgraph 500C. Therefore, recommended replacement candidate module 109 can recommend first replacement candidate server 510A to, for example, an administrator of the IT infrastructure 101, and server 501 can be replaced based on the first replacement candidate server.

Interoperability subgraphs 500B-C of FIG. 5B are shown for illustrative purposes only. An interoperability subgraph such as interoperability subgraphs 500B-C can include any number and type of nodes connected in any appropriate manner. Further, any appropriate number of replacement candidates can be determined for replacement of an IT element, and an interoperability subgraph such as interoperability subgraphs 500B-C can be determined for each replacement candidate.

Figure 6:
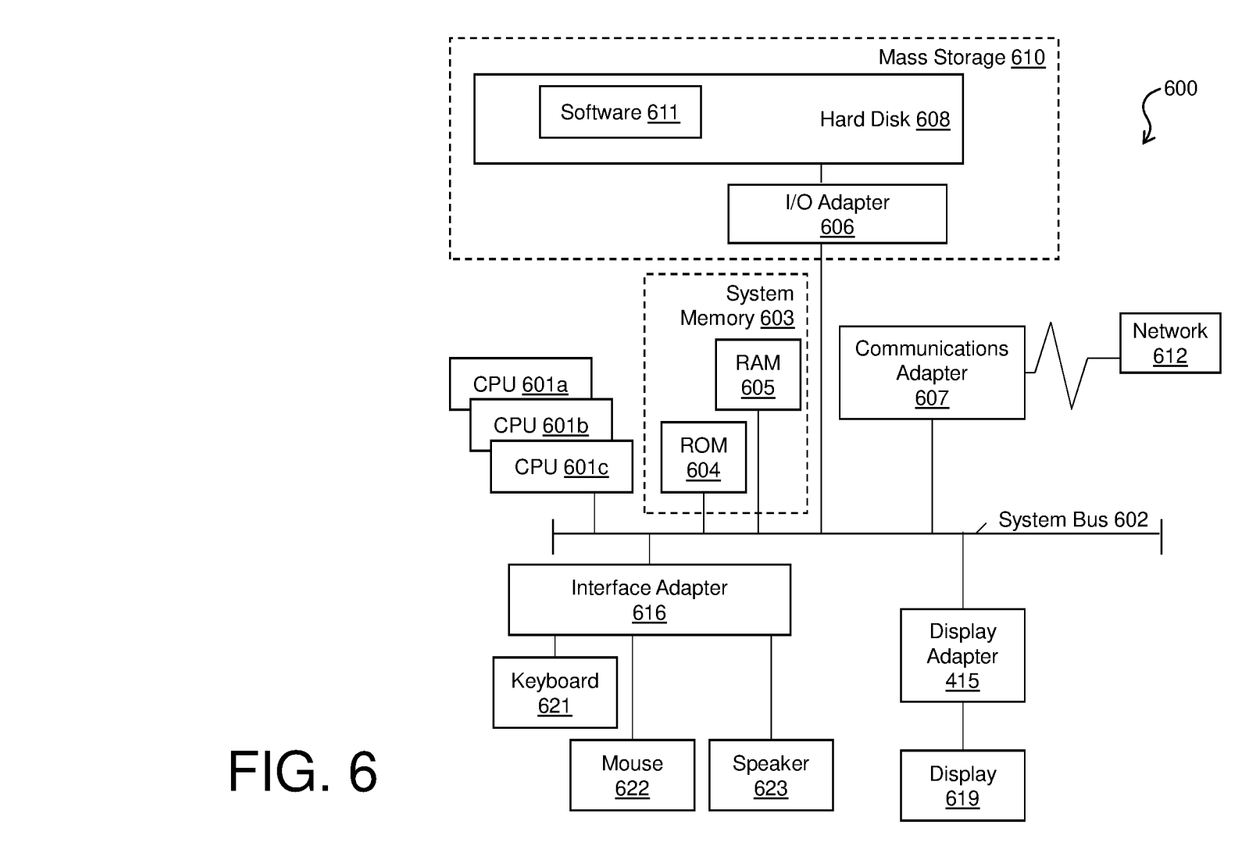
FIG. 6 is a block diagram of an example computer system for use in conjunction with one or more implementations of a topology based interoperability determination for an IT infrastructure in accordance with one or more embodiments of the invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a processor, a replacement notification for an element of an information technology (IT) infrastructure;
    generating, based on a topology graph of the IT infrastructure, a topology subgraph corresponding to the element;
    determining a plurality of replacement candidates for the element;
    generating, for each replacement candidate of the plurality of replacement candidates, an interoperability subgraph based on the topology subgraph; and
    selecting a recommended replacement candidate from the plurality of replacement candidates based on the generated interoperability subgraphs.

2. The computer-implemented method of claim 1, wherein the topology subgraph comprises a subset of nodes that are directly connected to the element in the topology graph.

3. The computer-implemented method of claim 2, wherein determining the plurality of replacement candidates for the element comprises identifying a plurality of approximate matches for the element in an interoperability graph.

4. The computer-implemented method of claim 3, wherein the interoperability graph is generated based on vendor data that is harvested from a plurality of vendor websites.

5. The computer-implemented method of claim 3, wherein generating, for each replacement candidate of the plurality of replacement candidates, a respective interoperability subgraph based on the topology subgraph comprises:
    identifying, for each node in the subset of nodes, a respective plurality of approximate matches in the interoperability graph; and
    determining a respective compatibility between each of the plurality of replacement candidates and each of the identified matches based on an interoperability matrix;
    wherein a match is that is determined to be compatible with a replacement candidate is included as a node in the interoperability subgraph of the replacement candidate.

6. The computer-implemented method of claim 5, wherein selecting a recommended replacement candidate from the plurality of replacement candidates based on the plurality of interoperability subgraphs comprises selecting a replacement candidate of the plurality of replacement candidates that has a highest number of nodes in the interoperability subgraph of the replacement candidate.

7. The method of claim 1, wherein the element is replaced in the IT infrastructure based on the recommended replacement candidate.

8. A system comprising:
    a memory having computer readable instructions; and
    one or more processors for executing the computer readable instructions, the computer readable instructions controlling the one or more processors to perform operations comprising:
        receiving a replacement notification for an element of an information technology (IT) infrastructure;
        generating, based on a topology graph of the IT infrastructure, a topology subgraph corresponding to the element;
        determining a plurality of replacement candidates for the element;
        generating, for each replacement candidate of the plurality of replacement candidates, a respective interoperability subgraph based on the topology subgraph; and
        selecting a recommended replacement candidate from the plurality of replacement candidates based on the generated interoperability subgraphs.

9. The system of claim 8, wherein the topology subgraph comprises a subset of nodes that are directly connected to the element in the topology graph.

10. The system of claim 9, wherein determining the plurality of replacement candidates for the element comprises identifying a plurality of approximate matches for the element in an interoperability graph.

11. The system of claim 10, wherein the interoperability graph is generated based on vendor data that is harvested from a plurality of vendor websites.

12. The system of claim 10, wherein generating, for each replacement candidate of the plurality of replacement candidates, a respective interoperability subgraph based on the topology subgraph comprises:
    identifying, for each node in the subset of nodes, a respective plurality of approximate matches in the interoperability graph; and
    determining a respective compatibility between each of the plurality of replacement candidates and each of the identified matches based on an interoperability matrix;
    wherein a match is that is determined to be compatible with a replacement candidate is included as a node in the interoperability subgraph of the replacement candidate.

13. The system of claim 12, wherein selecting a recommended replacement candidate from the plurality of replacement candidates based on the plurality of interoperability subgraphs comprises selecting a replacement candidate of the plurality of replacement candidates that has a highest number of nodes in the interoperability subgraph of the replacement candidate.

14. The system of claim 8, wherein the element is replaced in the IT infrastructure based on the recommended replacement candidate.

15. A computer program product comprising a computer readable storage medium having program instructions embodied therewith, the program instructions executable by one or more processors to cause the one or more processors to perform operations comprising:
    receiving a replacement notification for an element of an information technology (IT) infrastructure;

generating, based on a topology graph of the IT infrastructure, a topology subgraph corresponding to the element;

determining a plurality of replacement candidates for the element;

generating, for each replacement candidate of the plurality of replacement candidates, a respective interoperability subgraph based on the topology subgraph; and selecting a recommended replacement candidate from the plurality of replacement candidates based on the generated interoperability subgraphs.

16. The computer program product of claim 15, wherein the topology subgraph comprises a subset of nodes that are directly connected to the element in the topology graph.

17. The computer program product of claim 16, wherein determining the plurality of replacement candidates for the element comprises identifying a plurality of approximate matches for the element in an interoperability graph.

18. The computer program product of claim 17, wherein the interoperability graph is generated based on vendor data that is harvested from a plurality of vendor websites.

19. The computer program product of claim 17, wherein generating, for each replacement candidate of the plurality of replacement candidates, a respective interoperability subgraph based on the topology subgraph comprises:

identifying, for each node in the subset of nodes, a respective plurality of approximate matches in the interoperability graph; and determining a respective compatibility between each of the plurality of replacement candidates and each of the identified matches based on an interoperability matrix; wherein a match is that is determined to be compatible with a replacement candidate is included as a node in the interoperability subgraph of the replacement candidate.

20. The computer program product of claim 19, wherein selecting a recommended replacement candidate from the plurality of replacement candidates based on the plurality of interoperability subgraphs comprises selecting a replacement candidate of the plurality of replacement candidates that has a highest number of nodes in the interoperability subgraph of the replacement candidate.

\* \* \* \* \*